United States Patent
Krantz et al.

(10) Patent No.: US 9,249,995 B2
(45) Date of Patent: Feb. 2, 2016

(54) SOLAR PANEL POSITIONING SYSTEM

(71) Applicant: Goal Zero LLC, Bluffdale, UT (US)

(72) Inventors: Norman L. Krantz, Draper, UT (US);
Henry J. Howell, Herriman, UT (US);
David S. Smith, Woodland Hills, UT (US)

(73) Assignee: Goal Zero LLC, Bluffdale, UT (US)

( * ) Notice: Subject to any disclaimer, the term of this patent is extended or adjusted under 35 U.S.C. 154(b) by 0 days.

(21) Appl. No.: 14/096,837

(22) Filed: Dec. 4, 2013

(65) Prior Publication Data

US 2014/0158650 A1    Jun. 12, 2014

Related U.S. Application Data

(60) Provisional application No. 61/734,050, filed on Dec. 6, 2012.

(51) Int. Cl.
| | | |
|---|---|---|
| *F24J 2/00* | (2014.01) | |
| *F24J 2/52* | (2006.01) | |
| *H02S 20/30* | (2014.01) | |
| *H02S 20/23* | (2014.01) | |
| *H02S 20/24* | (2014.01) | |
| *F24J 2/54* | (2006.01) | |

(52) U.S. Cl.
CPC ............... *F24J 2/5264* (2013.01); *F24J 2/523* (2013.01); *F24J 2/5254* (2013.01); *H02S 20/23* (2014.12); *H02S 20/24* (2014.12); *H02S 20/30* (2014.12); *F24J 2/5211* (2013.01); *F24J 2002/5486* (2013.01); *Y02E 10/47* (2013.01); *Y02E 10/50* (2013.01)

(58) Field of Classification Search
CPC ........ Y02B 10/12; H02S 20/00; F24J 2/5211; F24J 2/5254; F16B 5/0685; F16B 12/32; F16B 9/023; F16B 7/04
USPC ......... 248/316.1, 316.6, 237, 220.21, 220.22, 248/229.1, 121, 122.1, 125.8; 52/173.3; 126/621, 622, 623, 624
See application file for complete search history.

(56) References Cited

U.S. PATENT DOCUMENTS

| | | | | |
|---|---|---|---|---|
| 4,269,173 A | * | 5/1981 | Krueger et al. | 126/634 |
| 4,371,139 A | * | 2/1983 | Clark | 248/237 |
| 4,421,943 A | * | 12/1983 | Withjack | 136/246 |
| 7,849,849 B2 | * | 12/2010 | Genschorek | 126/704 |

(Continued)

OTHER PUBLICATIONS

Zep Solar, ZS Comp; http://www.zepsolar.com/index.php/products/zs-comp; available at least as of Dec. 4, 2013; 2 pages.

(Continued)

*Primary Examiner* — Steven Marsh
(74) *Attorney, Agent, or Firm* — Foley & Lardner LLP

(57) ABSTRACT

A positioning system for a solar panel includes a frame, a surface plate, an adjustable rail and a frame coupling. The surface plate is configured to secure the positioning system to a mounting surface and includes a connection for an axle. The axle links the surface plate with the frame coupling or with the adjustable rail. The frame coupling attaches to the frame and holds the frame in an operating position. A length of the adjustable rail may be increased or decreased for varying the angular orientation of the frame relative to the mounting surface. The frame is configured to be removable from the frame coupling without requiring the surface plate to be removed from the mounting surface.

16 Claims, 11 Drawing Sheets

(56) References Cited

U.S. PATENT DOCUMENTS

| | | | |
|---|---|---|---|
| 8,407,895 B2* | 4/2013 | Hartelius et al. | 29/890.033 |
| 8,661,747 B2* | 3/2014 | Eide | 52/173.3 |
| 2004/0163338 A1* | 8/2004 | Liebendorfer | 52/173.1 |
| 2006/0086382 A1* | 4/2006 | Plaisted | 136/244 |
| 2011/0155127 A1* | 6/2011 | Li et al. | 126/704 |
| 2012/0085041 A1* | 4/2012 | Place | 52/173.3 |

OTHER PUBLICATIONS

Zep Solar, ZS Comp; Installation Manual for Composition Shingle Roofs—U.S., Document #800-0351-001 Rev E; File Generated Sep. 13, 2013, 66 pages.

* cited by examiner

SOLAR PANEL POSITIONING SYSTEM

CROSS-REFERENCE TO RELATED PATENT APPLICATIONS

This application claims the benefit of U.S. Provisional Patent Application No. 61/734,050, filed Dec. 6, 2012, which is incorporated herein by reference in its entirety.

BACKGROUND

The present disclosure relates to mechanical positioning systems such as mounting brackets and other positioning devices. In particular, the present disclosure relates to a positioning bracket for a solar panel.

A solar panel is a packaged assembly of photovoltaic cells. Solar panels use light energy (e.g., photons) from the sun to generate an electric current via the photovoltaic effect. A solar panel is typically used as a component of a larger photovoltaic system to generate and supply electricity in commercial and residential applications. Solar panels are an environmentally-friendly alternative to other sources of energy such as coal, oil, or gasoline.

Typically, solar panels are positioned in direct sunlight to maximize the energy generated by the panel. For example, solar panels are often positioned on a rooftop or other surface likely to receive sunlight. A mounting bracket may be used to secure the solar panel to the surface or position the solar panel to receive direct sunlight.

SUMMARY

One embodiment of the disclosure relates to a positioning system for a solar panel. The positioning system includes a frame, a surface plate, an adjustable rail and a frame coupling. In some embodiments, multiple surface plates, adjustable rails, or frame couplings are used. The surface plates are configured to secure the positioning system to a mounting surface and include a connection for an axle. The axle links a surface plate with a frame coupling or with an adjustable rail. The frame coupling attaches to the frame and holds the frame in an operating position. The length of the adjustable rails may be increased or decreased for varying the angular orientation of the frame relative to the mounting surface. Advantageously, the frame is configured to be removable from the frame couplings without requiring the surface plates to be removed from or otherwise disturbed upon the mounting surface.

BRIEF DESCRIPTION OF THE FIGURES

The disclosure will become more fully understood from the following detailed description, taken in conjunction with the accompanying figures, wherein like reference numerals refer to like elements.

DETAILED DESCRIPTION

Figure 1:
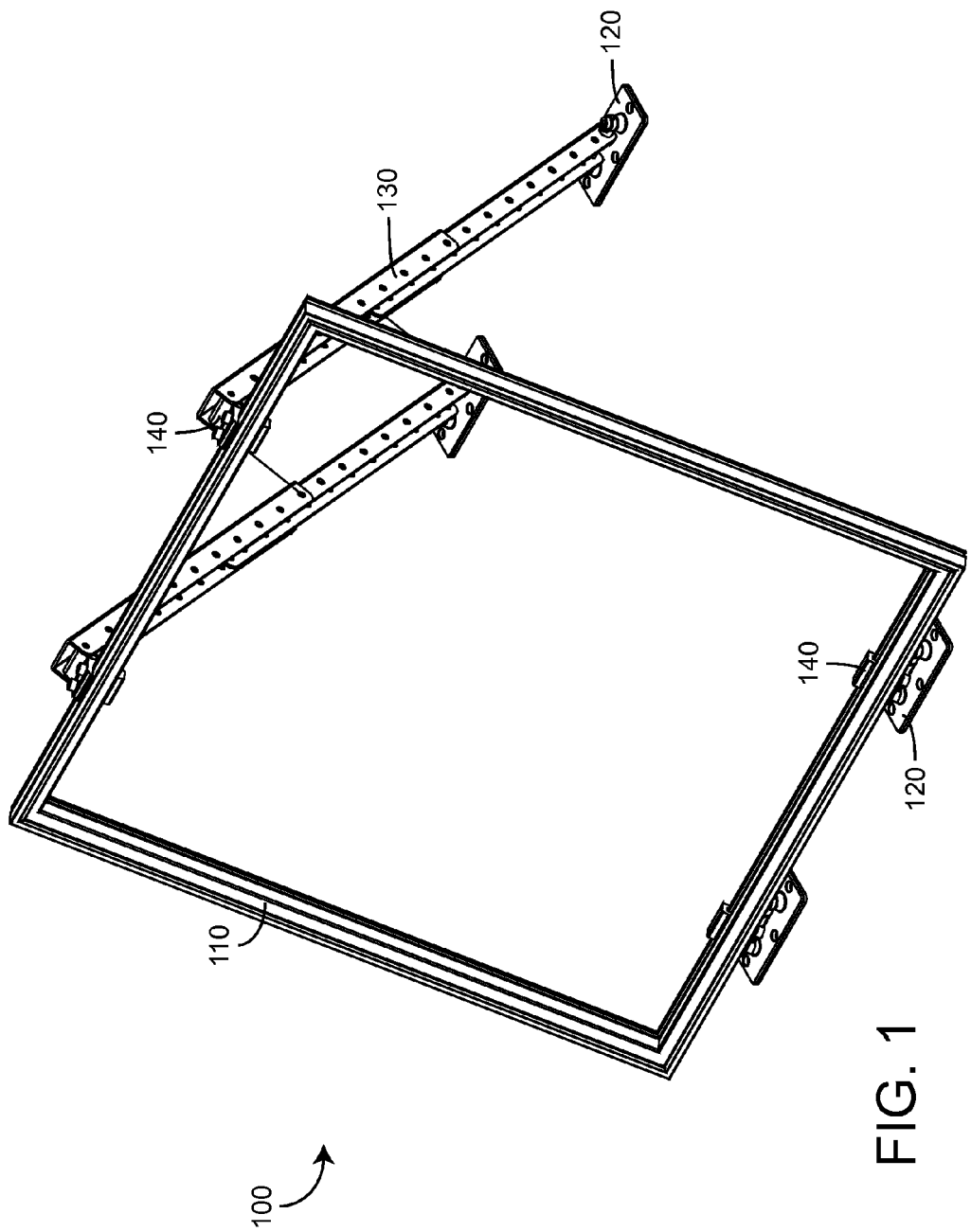
FIG. 1 is a schematic drawing of a perspective view of a solar panel positioning system including a frame, a surface plate, an adjustable rail, a frame coupling, and an axle, according to an exemplary embodiment.

Referring to FIG. 1, a positioning system 100 is shown, according to an exemplary embodiment. Positioning system 100 is shown to include a frame 110, a surface plate 120, an adjustable rail 130, and a frame coupling 140. Positioning system 100 may be used to support a solar panel, a plurality of solar panels, or another packaged assembly of photovoltaic cells. System 100 may provide structural support for a flexible solar panel, a semi-flexible solar panel, a rigid solar panel, or a group of solar panels. In some embodiments, system 100 may protect a solar panel from external sources of damage (e.g., physical, mechanical, electrical, chemical, water, etc.). Positioning system 100 may secure, fasten, support, orient, or otherwise place a solar panel in a position to receive solar energy (e.g., sunlight). For example, system 100 may attach to a rooftop (e.g., flat, sloped, curved, etc.), a wall, or any other mounting surface or structure.

In some embodiments, positioning system 100 may allow an angular orientation of the solar panel to be adjusted (e.g., by a user, mechanically, automatically, etc.). Advantageously, positioning system 100 may be adjusted to orient a solar panel such that sunlight more directly strikes a surface of the panel, thereby increasing the electric current generated by the solar panel. System 100 may replace a more complicated solar panel mounting bracket, thereby eliminating the need for a framework of racks and rails typically installed on a roof prior to the installation of solar panels. In some embodiments, system 100 may allow removal of a solar panel (e.g., for maintenance, repair, replacement, etc.) without detaching surface plate 120 from a mounting surface (e.g., a rooftop). Advantageously, continued contact between surface plate 120 and the mounting surface may maintain a watertight seal between system 100 and the mounting surface.

Figure 2A:
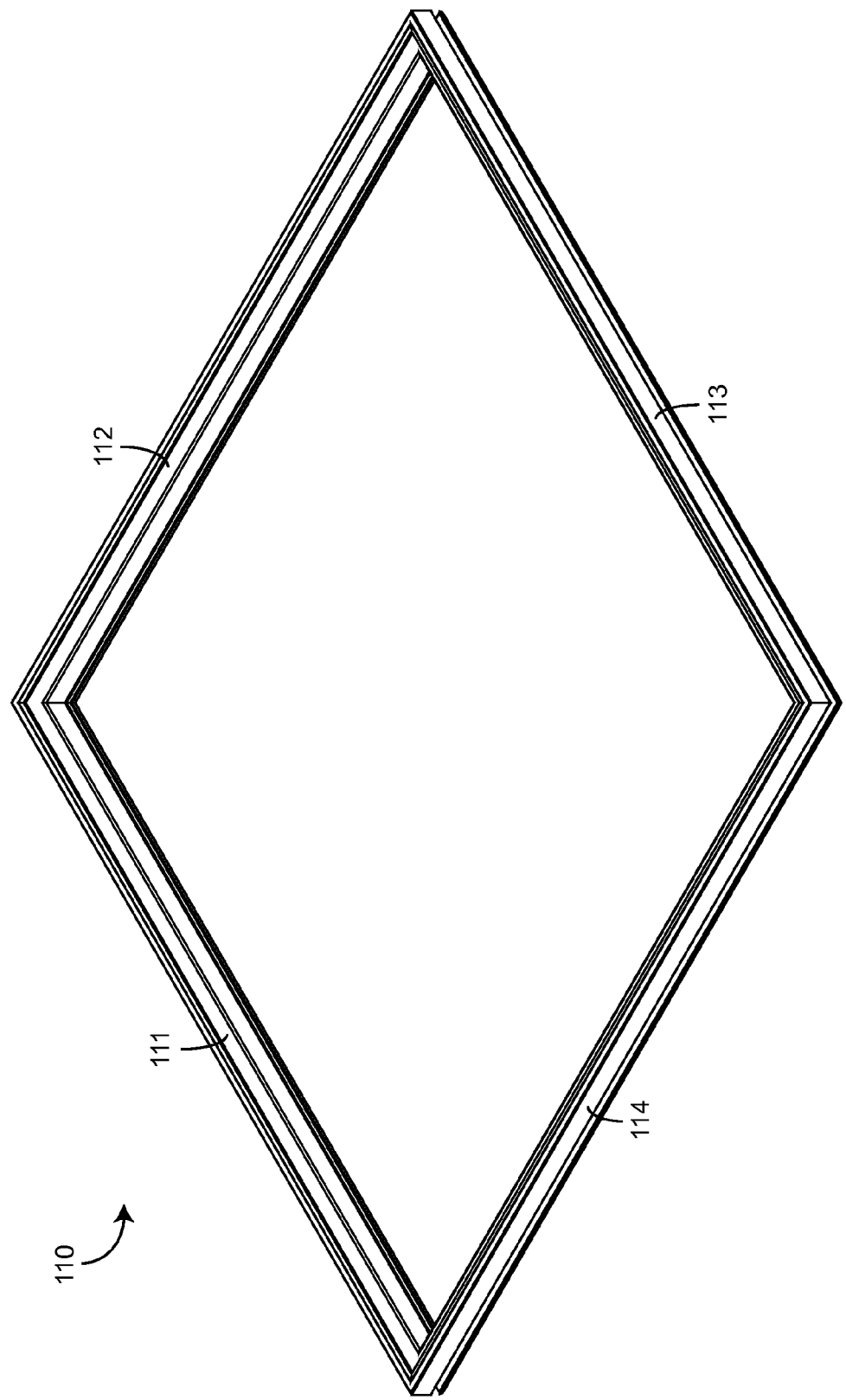
FIG. 2A is schematic drawing of a perspective view of the frame showing a plurality of frame segments, according to an exemplary embodiment.

Referring now to FIG. 2A, a perspective view of frame 110 is shown, according to an exemplary embodiment. Frame 110 may provide support for a solar panel, a plurality of solar panels, or another packaged assembly of photovoltaic cells.

Frame 110 may secure a solar panel in a fixed or adjustable position for receiving solar energy. In some embodiments, frame 110 may secure a solar panel along one or more edges of the panel or along an entire perimeter of the panel. In some embodiments, frame 110 provides only perimeter support for the panel. In other embodiments, frame 110 may provide additional support (e.g., supplemental to the perimeter support) with one or more crossbars, a front plate, a rear plate, etc.

Frame 110 may include a plurality of frame segments (e.g., frame segments 111-114) forming an outer perimeter of the frame. As shown in FIG. 2A, frame 110 may include four frame segments joined at right angles. In some embodiments, frame 110 may be substantially rectangular. In other embodiments, frame 110 may be hexagonal, circular, or have any other regular or irregular shape. In some embodiments, frame segments 111-114 may have identical cross-sections. For example, frame segments 111-114 may be cut to size or formed from a single extruded channel. Advantageously, identical frame segments 111-114 may allow frame 110 to be directionally unbiased (e.g., each frame segment may function as any other frame segment for attaching to a mounting surface, supporting a solar panel, or for any other purpose). In other embodiments, frame segments 111-114 may have varying cross-sections. The cross-sections of frame segments 111-114 may vary based on the function of the frame segment. For example, a bottom frame segment may include features for connecting the bottom frame segment to a mounting surface whereas a side frame segment may not include such features. Frame 110 may be made of any suitable material including aluminum or other metals, polymers, fiberglass, ceramics, elastomeric materials, or any combination thereof.

Figure 2B:
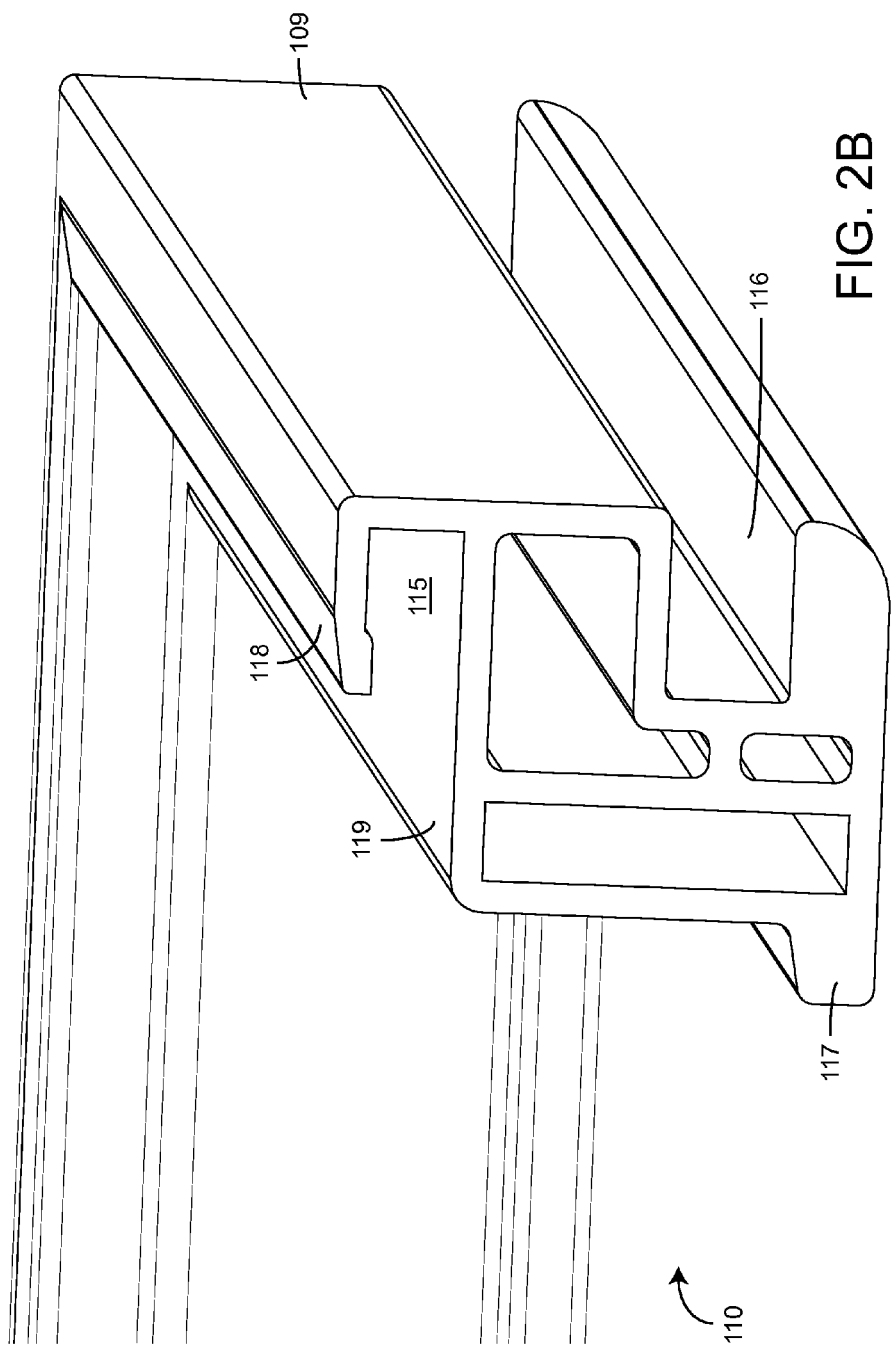
FIG. 2B is a cross-sectional drawing of a perspective view of the frame showing an interior channel for securing a solar panel and an exterior channel for attaching a frame coupling, according to an exemplary embodiment.

Referring now to FIG. 2B, a cross-sectional view of frame 110 is shown, according to an exemplary embodiment. Frame 110 is shown to include an exterior surface 109, an interior channel 115, an exterior channel 116, a flange 117, a front rim 118, and a support surface 119. Channel 115 may be defined as the space between support surface 119 and front rim 118. Channel 115 may be configured to receive an edge of a solar panel for holding, fastening, or otherwise securing the solar panel in an operating position. Channel 115 may extend along an inner perimeter of frame 110 such that the entire perimeter of the solar panel is contained within channel 115. In some embodiments, the width of channel 115 (e.g., the distance between rim 118 and surface 119) may be based on the thickness of the solar panel. In some embodiments, channel 115 may be configured to receive a solar panel without requiring disassembly of frame 110.

Still referring to FIG. 2B, frame 110 is shown to include a support surface 119. Surface 119 may provide structural support for a solar panel along an edge of the panel. In some embodiments, surface 119 may extend along an entire perimeter of frame 110, thereby supporting a solar panel on all sides. Surface 119 may be configured to align with a rear face of a solar panel (e.g., the face opposite the photovoltaic face) when the solar panel is secured by frame 110.

Still referring to FIG. 2B, frame 110 is shown to include a front rim 118. Rim 118 may be configured to align with a front face of a solar panel when the solar panel is supported by frame 110. Rim 118 may extend along an entire perimeter of frame 110. In some embodiments, rim 118 may define a surface substantially parallel to support surface 119. In other embodiments, rim 118 may have an angle of inclination relative to support surface 119. Rim 118 may be configured to provide a compression force on an edge of the solar panel contained within channel 115. For example, rim 118 may include an elastic portion (e.g., due to material selection, geometric configuration, etc.) which is stretched or compressed when a solar panel is contained within channel 115. The elastic portion may cause rim 118 to clamp, hold, secure, or otherwise fasten a solar panel in an operating position.

Still referring to FIG. 2B, frame 110 is shown to include an exterior channel 116. Channel 116 may be an indentation, slot, channel, or other receiving feature. Channel 116 may define a longitudinal slot in exterior surface 109 of one or more frame segments 111-114. Channel 116 may be configured to receive a peg, bolt, screw, flange, lip, cam, or other extruded feature from a separate component of positioning system 100 or another source. In some embodiments, channel 116 may extend along an entire perimeter of frame 110. In other embodiments channel 116 may exist only in a subset of frame segments (e.g., a bottom frame segment, a top frame segment, etc.) or may extend only along a portion of the perimeter of frame 110. Advantageously, channel 116 may allow frame 110 to slide (e.g., longitudinally in a direction parallel to channel 116) relative to a fixed component of system 100. This sliding ability may allow frame 110 to be repositioned without requiring disassembly or disengagement of system 100 from a mounting surface.

Still referring to FIG. 2B, frame 110 is shown to include a flange 117. Flange 117 may be a rim, lip, collar, or other extruded feature. Flange 117 may be configured to fit within a slot, channel, or other receiving feature of another component of system 100. Flange 117 may allow another component of system 100 (e.g., frame coupling 140) to grip, link, or otherwise attach to frame 110. In some embodiments, flange 117 may extend along an entire perimeter of frame 110. In other embodiments flange 117 may exist only in a subset of frame segments. In further embodiments, flange 117 may be localized to a particular area of one or more frame segments. For example, flange 117 may extend from a frame segment in one or more discrete locations.

Figure 3:
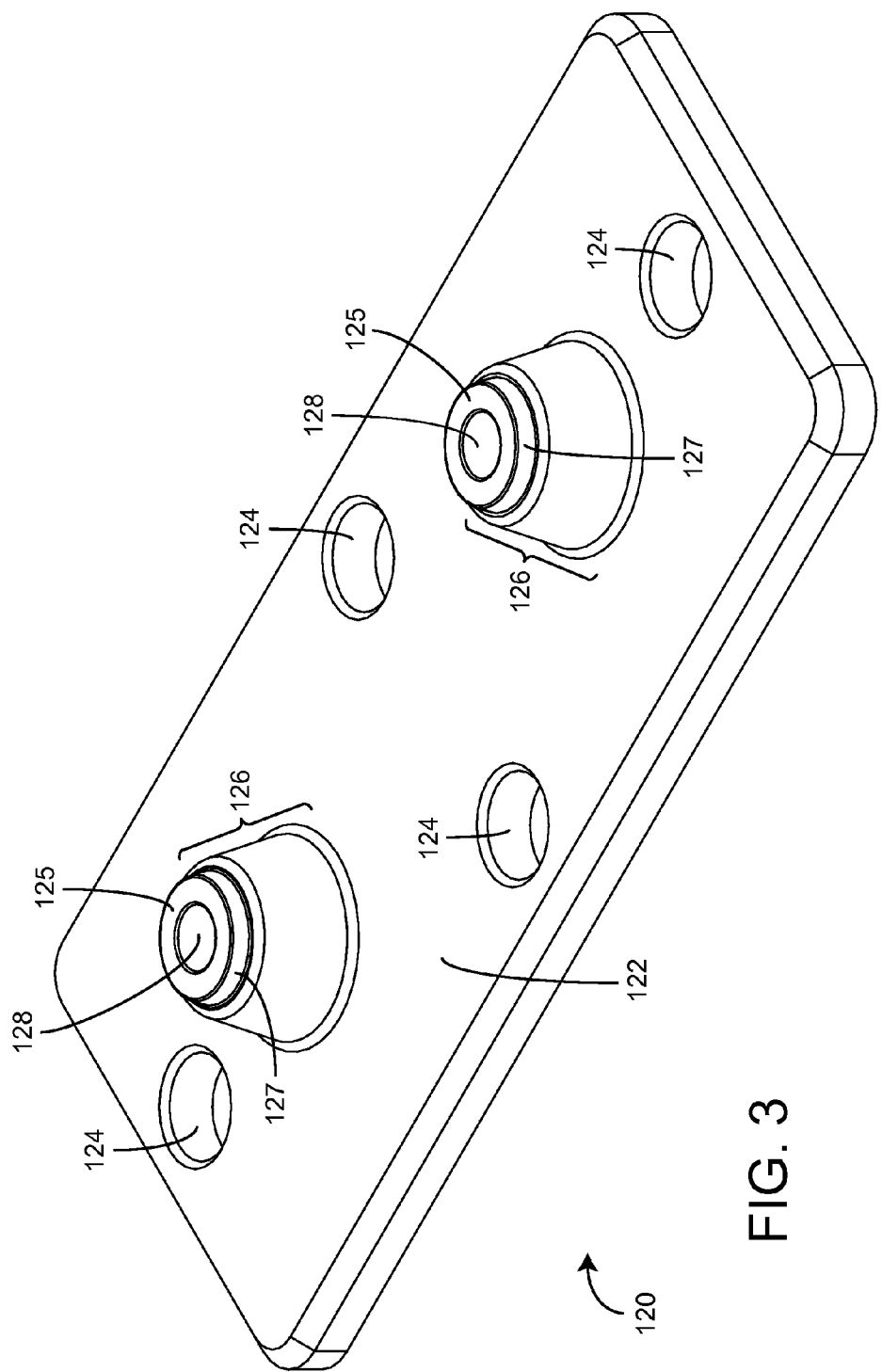
FIG. 3 is a schematic drawing of a perspective view of a surface plate showing holes for securing the plate to a mounting surface and extensions for attaching to a frame coupling or an adjustable rail, according to an exemplary embodiment.

Referring now to FIG. 3, a detailed view of surface plate 120 is shown, according to an exemplary embodiment. Surface plate 120 is shown to include a base 122, mounting holes 124, extensions 126 (e.g., bosses, etc.), and holes 128. Base 122 may be configured to align with a mounting surface such as a rooftop, wall, or other surface to which system 100 may be attached. In some embodiments, multiple surface plates 120 are used to secure frame 110 to a mounting surface in multiple locations. In some embodiments, base 122 is a flat plate configured to align with a substantially flat mounting surface. In other embodiments, base 122 may be curved or otherwise configured for attaching to non-flat mounting surfaces. Base 122 may have one or more angles, extrusions, or other features configured to secure base 122 to a variety of different mounting surfaces. Base 122 may be configured to attach to a fixed surface (e.g., a rooftop, building wall, etc.), a movable surface (e.g., a rotating surface configured to track a solar position), or any other suitable mounting element (e.g., another mounting bracket, extension or protrusion from a mounting surface, etc.)

In some embodiments, base 122 may be substantially rectangular. In other embodiments, base 122 may have any other regular or irregular shape (e.g., circular, hexagonal, etc.). Base 122 may be made of any suitable material including polymers, elastomeric materials, aluminum or other metals, ceramics, or any combination thereof. Advantageously, base 122 may be configured to provide a watertight seal between base 122 and a mounting surface to which base 122 may be attached. For example, if base 122 is attached to a rooftop, the watertight seal may prevent moisture (e.g., rain water, mist, condensation, etc.) from accumulating between base 122 and the rooftop. In some embodiments, an elastomeric gasket, o-ring, or other sealing element may be positioned between base 122 and the mounting surface. In other embodiments, a sealant (e.g., tar, caulking, putty, gel, etc.) may be applied to base 122 for providing the watertight seal. The sealant may be applied between base 122 and the mounting surface, around a perimeter of base 122, over a top surface of base 122 and the mounting surface, or in any other configuration.

Still referring to FIG. 3, surface plate 120 is shown to include a plurality of mounting holes 124. In some embodiments, holes 124 are intended to be used for securing surface plate 120 to a mounting surface. Holes 124 may be configured to receive bolts, screws, pins, or other fastening hardware. For example, a bolt or screw may be inserted through one or more of holes 124 for securing surface plate 120 to a rooftop. Holes 124 may extend partially or entirely through base 122 and may be threaded or unthreaded. In some embodiments, holes 124 may include a sealing element (e.g., an o-ring, perimeter seal, etc.) configured to prevent fluid from penetrating holes 124. Holes 124 may be configured to receive a flat or countersunk screw or bolt having a flat outer face. Holes 124 may be configured to position the screw or bolt such that the flat outer face aligns with a surface of base 122.

Still referring to FIG. 3, surface plate 120 is shown to include extensions 126. Extensions 126 may be protrusions, extrusions, or other features extending from base 122. Extensions 126 may include an elevated surface 125 and an intermediate surface 127. Surface 125 may be configured to align with a surface of a connecting element such as axle 150, described in greater detail in reference to FIG. 5. Surface 127 may be configured to align with a rim of the connecting element for preventing lateral movement of the connecting element or otherwise securing the connecting element in an operating position. Extensions 126 may provide a volume (e.g., between extensions 126, or between base 122 and surface 125) for containing or securing the connecting element.

In some embodiments, extensions 126 may be frustoconical (e.g., shaped as a frustum of a cone). In other embodiments, extensions 126 may be cylindrical, or have any other shape. In some embodiments, extensions 126 may be formed separately from base 122 and attached, fastened, adhered, or otherwise secured to base 122. In other embodiments, extensions 126 and base 122 may be combined into a unitary component. For example, surface plate 120 may be molded, cast, or otherwise formed into a single component including both base 122 and extensions 126.

Still referring to FIG. 3, surface plate 120 is shown to include holes 128. In some embodiments, holes 128 are intended to be used for securing a connecting element (e.g., axle 150) to extensions 126. Holes 128 may be configured to receive bolts, screws, pins, or other fastening hardware. Holes 128 may extend partially or entirely through extensions 126 and may be threaded or unthreaded. In some embodiments, holes 128 may include a sealing element (e.g., an o-ring, perimeter seal, gasket, etc.) configured to prevent fluid from penetrating holes 128.

Figure 4A:
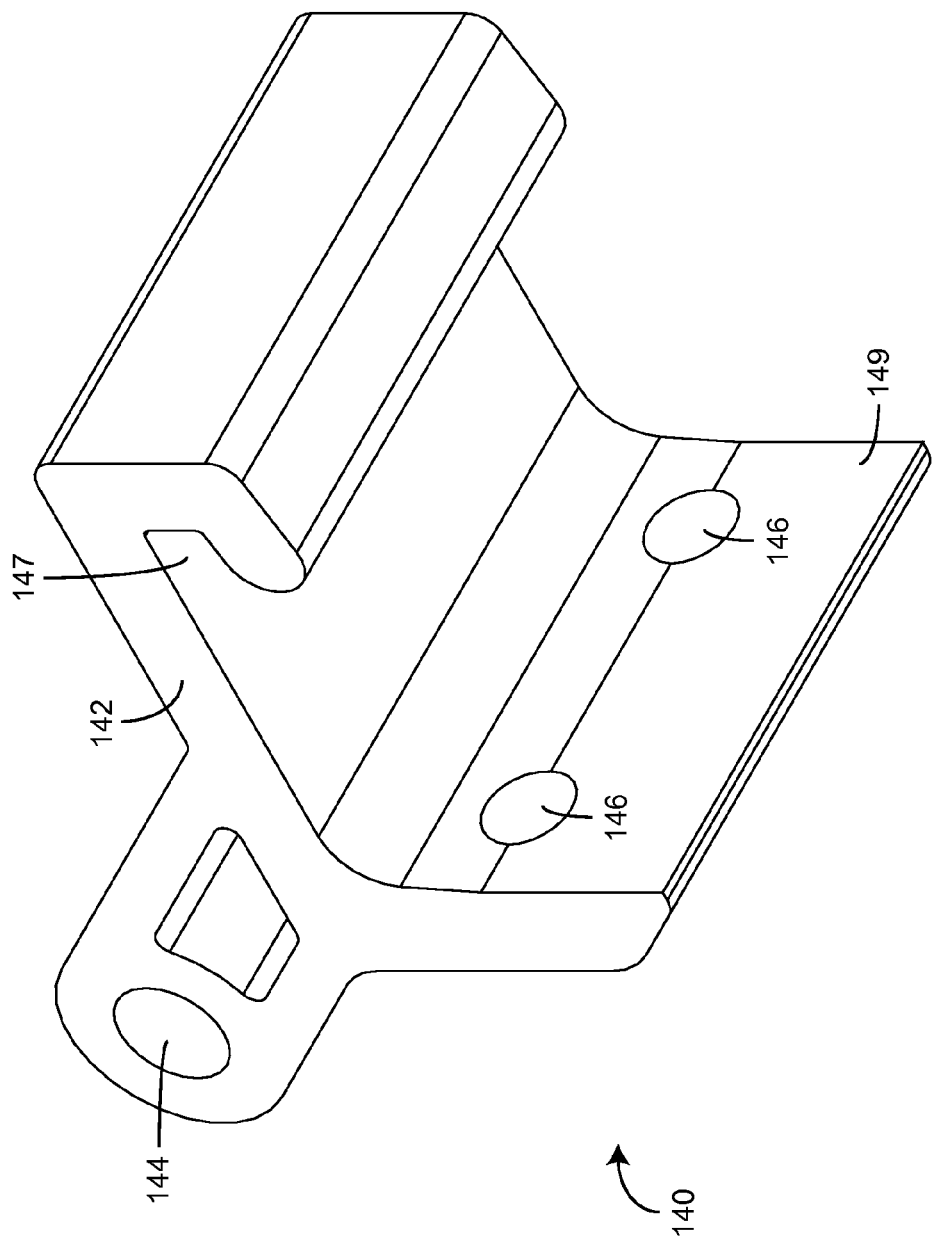
FIG. 4A is a schematic drawing of a perspective view of a frame coupling showing a channel and holes for securing the frame coupling to the frame as well as a hole for receiving an axle about which the frame coupling rotates, according to an exemplary embodiment.

Referring now to FIG. 4A, a detailed view of frame coupling 140 is shown, according to an exemplary embodiment. In some embodiments, frame coupling 140 is intended to engage frame 110. In other embodiments, coupling 140 may be adjusted or reconfigured to engage other frame designs. Frame coupling 140 is intended to form a connection between frame 110 and axle 150, described in greater detail in reference to FIG. 5. In some embodiments, frame coupling 140 is also intended to form a connection between frame 110 and rail 130, described in greater detail in reference to FIG. 7. In some embodiments, multiple frame couplings 140 are used for securing frame 110 to multiple axles 150 and/or multiple rails 130.

Still referring to FIG. 4A, frame coupling 140 is shown to include a side surface 142, a bore 144 in side surface 142, a support surface 149, holes 146 in surface 149, and a channel 147. Surface 142 may define a side of coupling 140. In some embodiments, coupling 140 is symmetrical having two identical side surfaces 142 (e.g., a left side surface and a right side surface). Surface 142 may be configured to align with a mating surface (e.g., surface 152 of axle 150) for positioning frame coupling 140 relative to axle 150 or surface plate 120. In some embodiments, bore 144 may be configured to receive axle 150. Surface 142 may be configured to align with surface 152 when axle 150 is inserted into bore 144. Advantageously, frame coupling 140 may be allowed to rotate about axle 150. This rotation may allow the angular orientation of frame coupling 140 and frame 110 to be adjusted relative to surface plate 120.

Figure 4B:
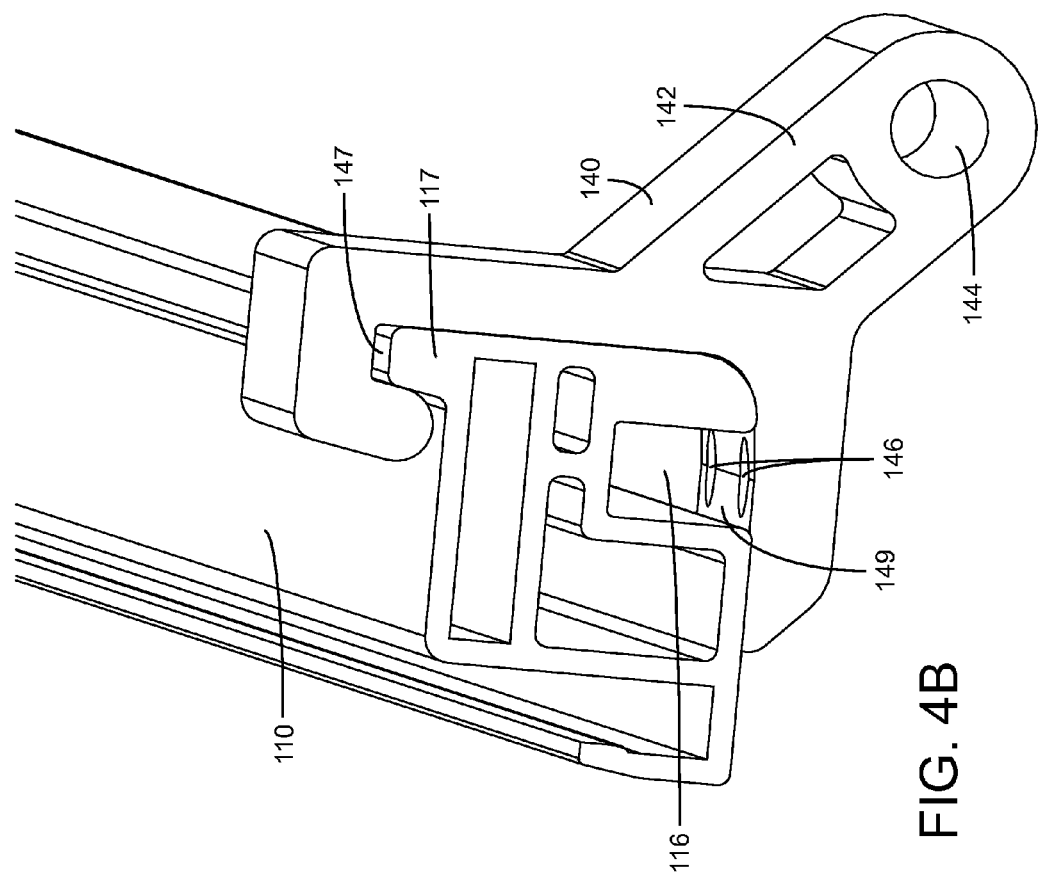
FIG. 4B is a schematic drawing of a perspective view of a frame coupling attached to the frame, according to an exemplary embodiment.

Referring now to FIG. 4B, frame coupling 140 is intended to attach to frame 110. Frame coupling 140 may secure, hold, orient, or otherwise place frame 110 in an operating position. In some embodiments, frame coupling 140 rigidly attaches to frame 110. In other embodiments the connection is flexible or has one or more degrees of freedom (e.g., permitting movement in one or more directions, rotation about one or more axes, etc.).

Still referring to FIG. 4B, frame coupling 140 is shown to include a channel 147. Channel 147 may be configured to receive a flange 117 extending from frame 110. Channel 147 is intended to clamp, grip, contain, or otherwise secure flange 117 within channel 147. In some embodiments, channel 147 may allow frame coupling 140 to slide longitudinally along flange 117. Advantageously, channel 147 may allow frame 110 to pivot or rotate about flange 117. Such rotation may permit frame 110 to be adjusted, repositioned, or removed entirely from coupling 140 without requiring further disassembly of system 100. For example, frame 110 may be rotated about flange 117 and disengaged from frame coupling 140, thereby allowing frame 110 and the solar panel to be removed without affecting other components of system 100 (e.g., surface plates 120, a seal between surface plates 120 and a mounting surface, etc.).

Frame coupling 140 may further include a support surface 149. Support surface 149 is intended to align with exterior surface 109 when frame coupling 140 is engaged with frame 110. Surface 149 may provide support (e.g., structural support, load bearing support, etc.) for frame 110. In some embodiments, surface 149 may be configured to at least partially cover channel 116. Support surface 149 may be positioned on an opposite side of frame coupling 140 from channel 147 such that frame coupling 140 engages frame 110 along two or more sides.

Still referring to FIG. 4B, frame coupling 140 is further shown to include holes 146. Holes 146 may extend through surface 149. Holes 146 may be configured to receive a screw, bolt, pin, or other fastener and may be threaded or unthreaded. In some embodiments, holes 146 may be configured to align with channel 116 when frame coupling 140 is engaged with frame 110. The alignment of holes 146 with channel 116 is intended to allow a fastener to extend through holes 146 and into channel 116. The fastener may engage a surface of channel 116 (e.g., a side surface, top surface, etc.) and secure frame coupling 140 in a fixed position.

Advantageously, the configuration of holes 146 and channel 116 may allow frame 110 to be removed from an operating position (e.g., for maintenance, repair, replacement, or inspection of the supported solar panel) without requiring disassembly or disengagement of system 100 from a mounting surface. For example, removing the fasteners from holes 146 or channel 116 may allow frame 110 to be rotated about flange 117. Such rotation may permit frame 110 to be removed from frame coupling 140 without affecting other components of positioning system 100 (e.g., surface plates 120, a seal between surface plates 120 and a mounting surface, a connection between frame 110 and the solar panel, etc.).

Figure 5:
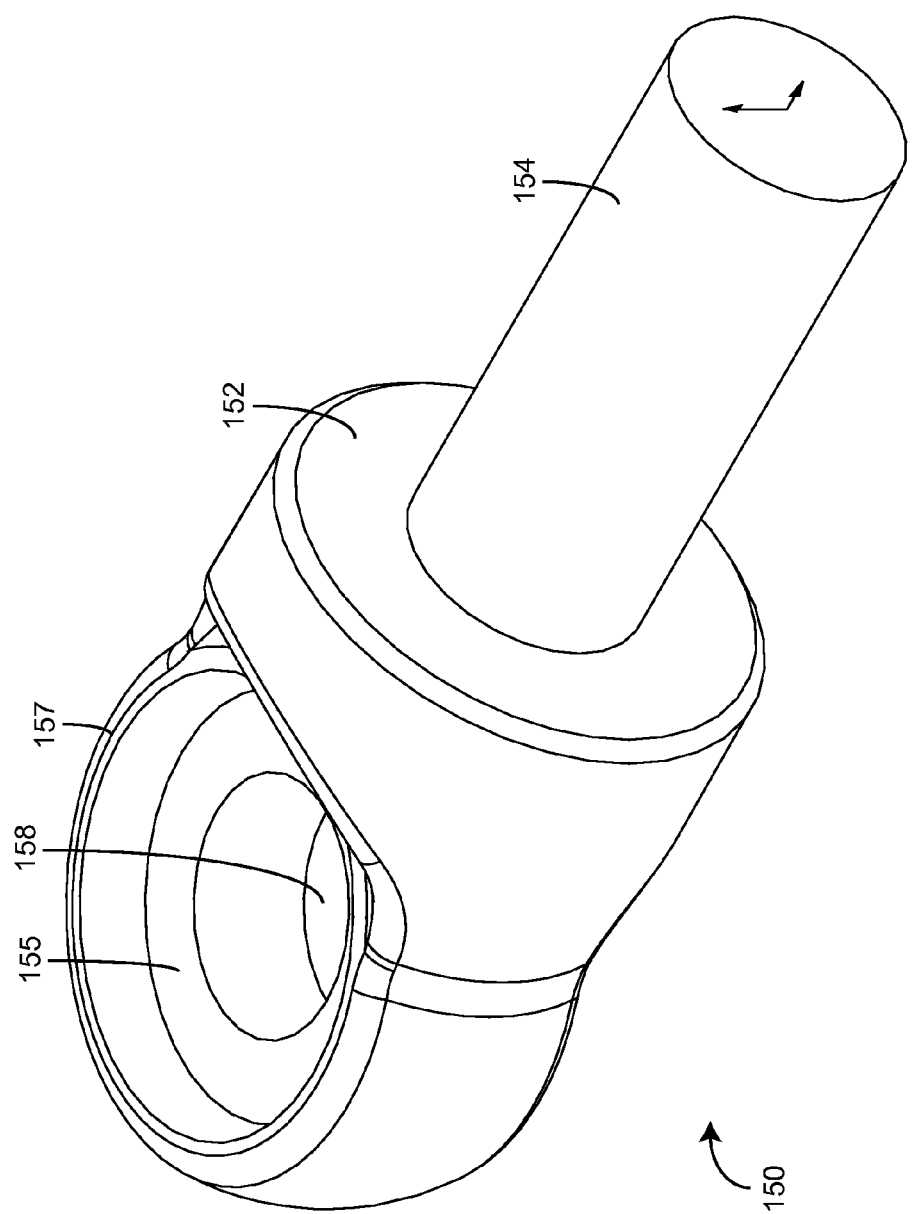
FIG. 5 is a schematic drawing of a perspective view of the axle, according to an exemplary embodiment.
Figure 6:
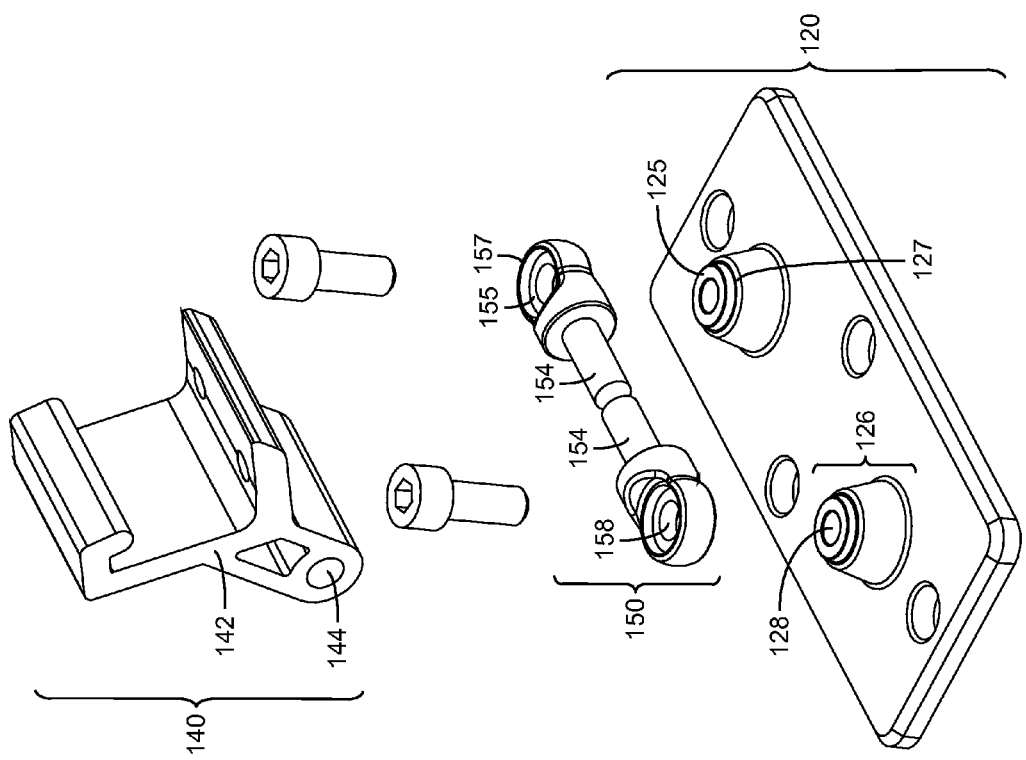
FIG. 6 is a schematic drawing of a perspective view of a frame coupling, a pair of axles, and a surface plate showing the alignment of the axles with the surface plate, according to an exemplary embodiment.

Referring now to FIGS. 5 and 6, positioning system 100 is further shown to include an axle 150. Axle 150 is shown to include a surface 152, a shaft 154 extending from surface 152, a surface 155, a rim 157, and a hole 158. Axle 150 is intended to link surface plate 120 with frame coupling 140 and/or adjustable rail 130. In some embodiments, multiple axles 150 are used in conjunction with multiple surface plates 120. In some embodiments, axle 150 may be configured to align with extension 126. For example, surface 155 may be configured to align with surface 125, and rim 157 may be configured to align with surface 127. When surfaces 125,155 and features 127,157 are aligned, hole 158 may be coaxially aligned with hole 128. A screw, bolt, pin, or other fastener may be inserted through hole 158 for securing axle 150 to extension 126.

Axle 150 is further shown to include a surface 152 and a shaft 154. In some embodiments, surface 152 may be substantially perpendicular to surface 155. Shaft 154 may extend longitudinally from surface 152. In some embodiments, shaft 154 may extend from surface 152 in a direction normal to surface 152. Shaft 154 may be substantially parallel to base 122 when axle 150 is secured to extension 126. In some embodiments, shaft 154 may be inserted into hole 142 in frame coupling 140. Surface 152 may be configured to align with surface 142 of frame coupling 140 when shaft 154 is inserted into hole 142. Shaft 154 may define an axis about which frame coupling 140 is permitted to rotate. Advantageously, such rotation may allow the angular orientation of frame coupling 140 and frame 110 to be adjusted relative to surface plate 120 or the mounting surface. In other embodiments, shaft 154 may be inserted into or through one or more holes in adjustable rail 130.

Figure 7:
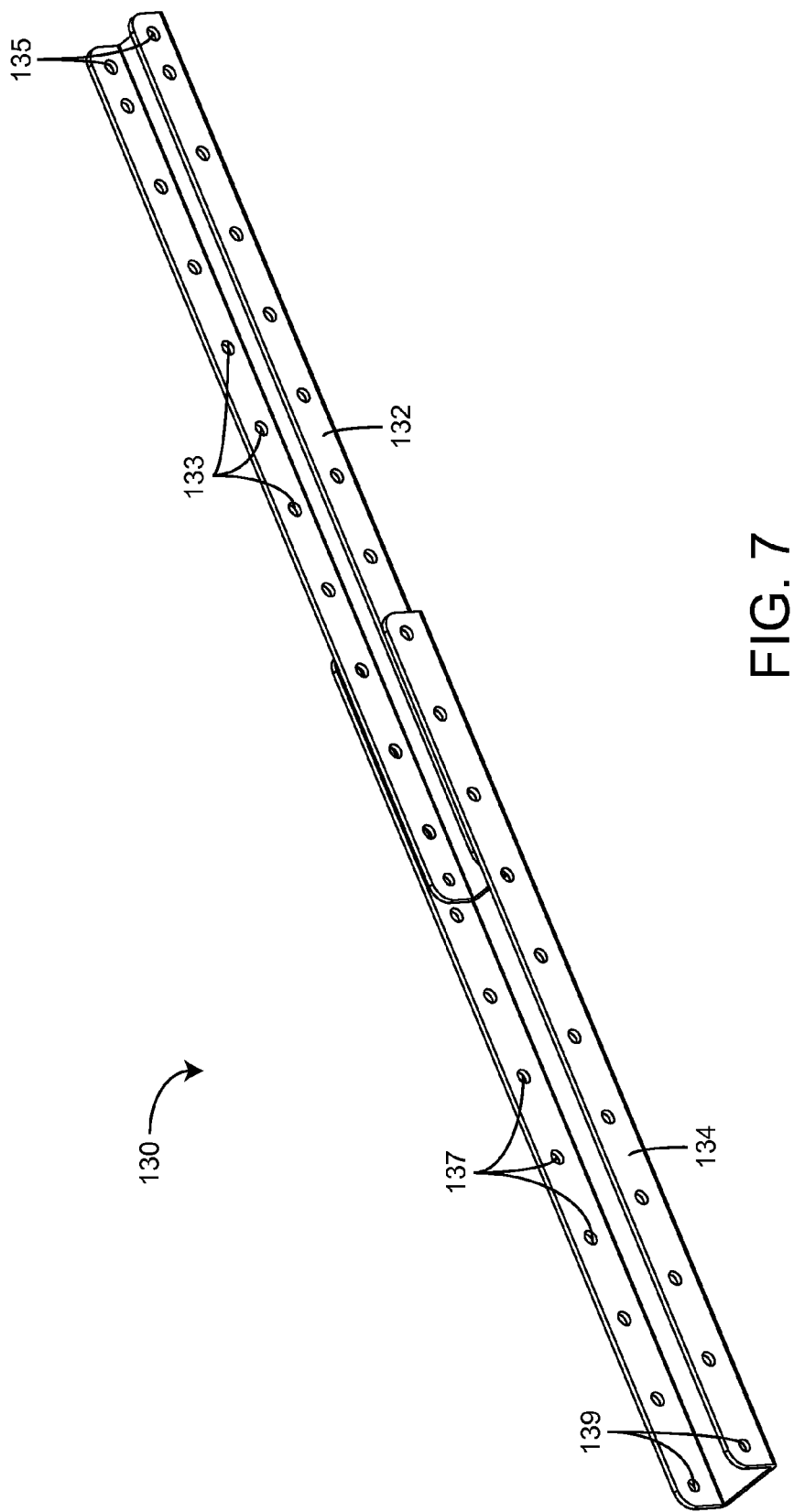
FIG. 7 is a schematic drawing of a perspective view of an adjustable rail showing an inner rail, an outer rail, and a plurality of alignment holes, according to an exemplary embodiment.

Referring now to FIG. 7, adjustable rail 130 is shown, according to an exemplary embodiment. Rail 130 may be used to control a distance between one or more of surface plates 120 and frame couplings 140. The distance between surface plates 120 and couplings 140 (e.g., relative to other surface plates 120 and couplings 140) may allow frame 110 to be positioned at an angle relative to the mounting surface to which surface plates 120 are secured. Advantageously, the angle of orientation of frame 110 relative to the mounting surface may allow a supported solar panel to receive more direct sunlight than would otherwise be received (e.g., without an angle of orientation).

Still referring to FIG. 7, rail 130 is shown to include an inner rail 132 and an outer rail 134. Inner rail 132 may include alignment holes 133 and end holes 135. Outer rail 134 may include alignment holes 137 and end holes 139. In some embodiments, rails 132,134 may be "U channels" (e.g., channels having a "U-shaped" cross section in a direction perpendicular to the longitudinal extension of the channel). In other embodiments, rails 132,134 may have a rectangular cross section or other suitable cross-sectional shape. In some embodiments, inner rail 132 may be configured to fit within outer rail 134. For example, one or more dimensions (e.g., width, depth, thickness, etc.) of rail 132 may be reduced relative to rail 134 such that inner rail 132 fits within rail 134 in a telescoping manner. Rail 132 may fit completely within rail 134 or partially within rail 134.

In some embodiments, rail 130 may have an adjustable length. For example, rail 132 may be allowed to slide longitudinally within rail 134. This sliding may permit the overall length of rail 130 (e.g., the length of rail 132 plus the non-overlapping length of rail 134) to be increased or decreased. Advantageously, the variable length of rail 130 may allow an angle of inclination of frame 110 relative to the mounting surface to be adjusted. In some embodiments, the length of rail 130 may be adjusted manually. In other embodiments, the length of rail 130 may be adjusted automatically (e.g., by a mechanical or electromechanical device). The length of rail 130 may be adjusted to track the position of the sun, to receive more direct sunlight, or for any other purpose.

In some embodiments, rail 130 may include alignment holes 133,137. Holes 133 may extend through rail 132 and holes 137 may extend through rail 134. Holes 133 may include a single hole, a set of holes, or a plurality of holes spaced longitudinally along rail 132. Similarly, holes 137 may include a single hole, a set of holes, or a plurality of holes spaced longitudinally along rail 134. In some embodiments, alignment holes 133,137 may be spaced regularly along a length of rail 130 (e.g., the distance between a plurality of holes 133,137 may be constant along the length of rail 130). In some embodiments, holes 133,137 extend through one or more sides of rail 130. In other embodiments, holes 133,137 may extend through a front face, a rear face, or any other face of rail 130.

In some embodiments, holes 133 may be configured to align with holes 137. For example, a regular distance between holes 133 may correspond to (e.g., be equal to, a multiple of, a factor of, etc.) a regular distance between holes 137. In some embodiments, holes 133,137 may align at multiple lengths of rail 130. Holes 133,137 may be configured to receive a bolt, screw, rod, pin, or other fastener for securing rail 130 at a desired length. For example, rail 132 may be allowed to slide within rail 134 until a desired overall length is attained. A fastener may be inserted through one or more of holes 133, 137 to lock the position of rail 132 relative to rail 134, thereby fixing the overall length of rail 130.

In some embodiments, rail 130 may further include end holes 135,139. End holes 135 may extend through rail 132 and end holes 139 may extend through rail 134. In some embodiments, holes 135,139 may be spaced at a regular distance with holes 133,137. For example, the distance between end holes 135 and the closest of holes 133 may equal a regular distance between holes 133. In other embodiments, the distance between holes 135,139 and holes 133,137 may be greater than or less than a regular distance between holes 133,137.

Figure 8:
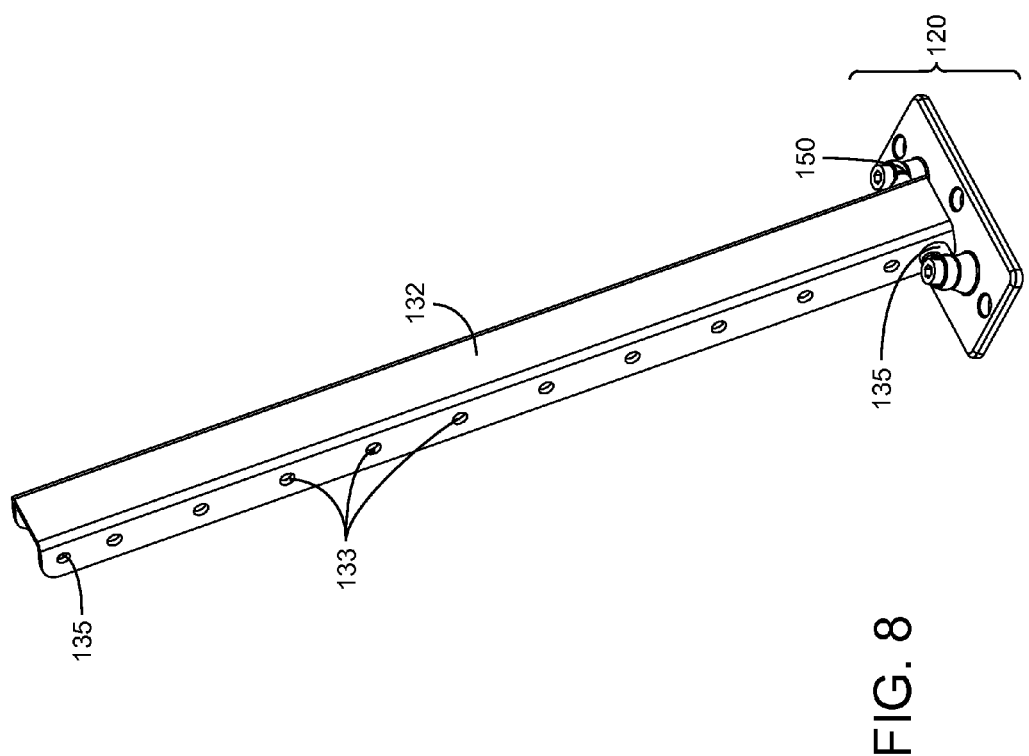
FIG. 8 is a schematic drawing of a perspective view of the inner rail attached axially to a surface plate, according to an exemplary embodiment.

Referring now to FIG. 8, rail 130 may be attached to surface plate 120. In some embodiments, axle 150 may extend through one or more of end holes 135, thereby linking inner rail 132 with surface plate 120. In other embodiments, axle 150 may extend through one or more of end holes 139, thereby linking outer rail 134 with surface plate 120. Advantageously, the axial link between rail 130 and surface plate 120 may allow rail 130 to rotate (e.g., about axle 150) relative to surface plate 120. This rotation may permit rail 130 to extend between surface plate 120 and a segment of frame 110 regardless of the angular orientation of frame 110.

Figure 9:
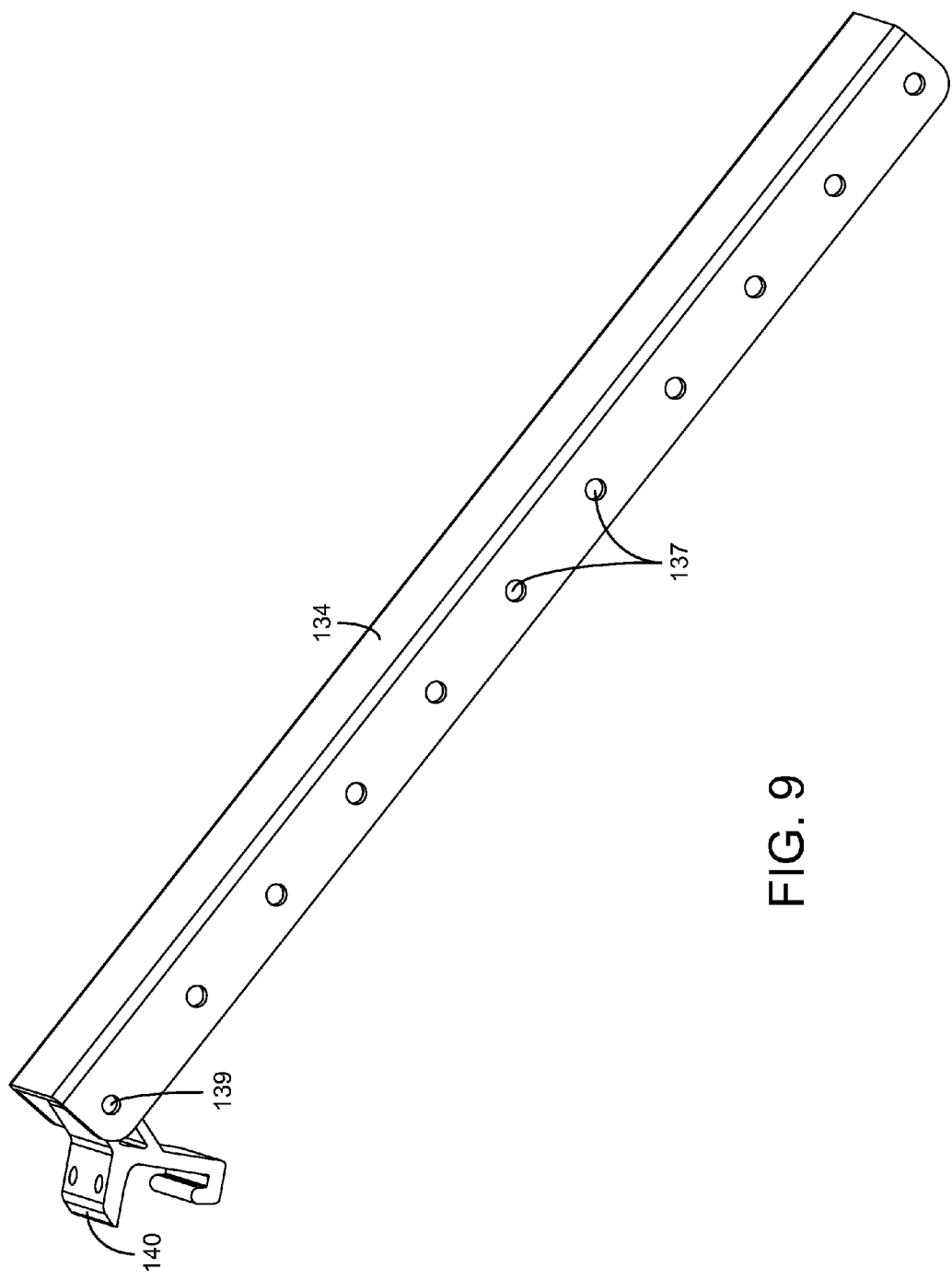
FIG. 9 is a schematic drawing of a perspective view of the outer rail attached to a frame coupling, according to an exemplary embodiment.

Referring now to FIG. 9, rail 130 may be attached to frame coupling 140. In some embodiments, a pin, bolt, screw, or other fastener may extend through one or more of end holes 139, thereby linking outer rail 134 with frame coupling 140. In other embodiments, the fastener may extend through one or more of end holes 135, thereby linking inner rail 132 with coupling 140. Advantageously, the axial link between rail 130 and frame coupling 140 may allow rail 130 to rotate (e.g., about the fastener) relative to coupling 140. This rotation may permit rail 130 to extend between coupling 140 and surface plate 120 regardless of the angular orientation of frame 110.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The invention claimed is:

1. A positioning system for a solar panel, the positioning system comprising:
a frame having a first edge and a second edge, the frame including a flange protruding from at least one of the first edge and the second edge, wherein the frame is configured to support a solar panel;
a first coupling bracket coupled to the first edge of the frame and a second coupling bracket coupled to the second edge of the frame, at least one of the first coupling bracket and the second coupling bracket including a channel configured to receive the flange, the frame being rotatable about the flange between a first position and a second position when the flange is received by the channel, wherein the flange and the channel cooperate to secure the frame when the frame is in the first position, wherein the flange is removable from the channel when the frame is in the second position, wherein removing the flange from the channel detaches the frame from one or more of the coupling brackets;
a first surface plate and a second surface plate, wherein the surface plates are configured to attach to a mounting surface, wherein the first surface plate is pivotally coupled to the first coupling bracket; and
a rail having a first end and a second end, wherein the first end is pivotally coupled to the second coupling bracket and the second end is pivotally coupled to the second surface plate,
wherein adjusting a length along the rail between the second coupling bracket and the second surface plate alters an angle of orientation of the solar panel relative to the mounting surface.

2. The positioning system of claim 1, further comprising:
a first axle and a second axle, wherein the first axle pivotally couples the first surface plate to the first coupling bracket and wherein the second axle pivotally couples the second surface plate to the rail.

3. The positioning system of claim 2, wherein the first coupling bracket is rotatable about the first axle and wherein the rail is rotatable about the second axle.

4. The positioning system of claim 2, wherein the axles include an end portion and a shaft extending from the end portion, wherein the end portion includes a hole configured to align with a hole in the surface plates for fastening the axles to the surface plates.

5. The positioning system of claim 1, wherein the frame includes a second channel in one or more edges and wherein one or more of the coupling brackets include a hole extending through a portion of the bracket, wherein the hole aligns with the second channel when the frame is in the first position.

6. The positioning system of claim 5, wherein the positioning system is configured to receive a fastener through the hole and into the second channel, wherein the fastener secures the frame in the first position.

7. The positioning system of claim 1, wherein the coupling brackets each include a bore defining an axis, wherein the coupling brackets are rotatable about the axes.

8. The positioning system of claim 1, wherein the surface plates are configured to provide a watertight seal between the surface plates and the mounting surface.

9. A positioning system for a solar panel, the positioning system comprising:
a frame having a first edge and a second edge, the frame including a flange protruding from at least one of the first edge and the second edge, wherein the frame is configured to support a solar panel;
a first coupling bracket coupled to the first edge of the frame and a second coupling bracket coupled to the second edge of the frame, at least one of the first coupling bracket and the second coupling bracket including a channel configured to receive the flange, the frame being rotatable about the flange between a first position and a second position when the flange is received by the channel, wherein the flange and the channel cooperate to secure the frame when the coupling bracket is in the first position, wherein the flange is removable from the channel when the coupling bracket is in the second position, wherein removing the flange from the channel detaches the frame from one or more of the coupling brackets; and
a first surface plate and a second surface plate, wherein the surface plates are configured to attach to a mounting surface, wherein the first surface plate is pivotally coupled to the first coupling bracket and the second surface plate is pivotally coupled to the second coupling bracket.

10. The positioning system of claim 9, further comprising:
an axle, wherein the axle pivotally couples the first surface plate to the first coupling bracket.

11. The positioning system of claim 10, wherein the first coupling bracket is rotatable about the axle.

12. The positioning system of claim 10, wherein the axle includes an end portion and a shaft extending from the end portion, wherein the end portion includes a hole configured to align with a hole in the surface plates for fastening the axle to at least one of the surface plates.

13. The positioning system of claim 9, wherein the frame includes a second channel in one or more edges and wherein one or more of the coupling brackets include a hole extending through a portion of the bracket, wherein the hole aligns with the second channel when the coupling bracket is in the first position.

14. The positioning system of claim 13, wherein the positioning system is configured to receive a fastener through the hole and into the second channel, wherein the fastener secures the coupling bracket in the first position.

15. The positioning system of claim 9, wherein the coupling brackets each include a bore defining an axis, wherein the coupling brackets are rotatable about the axes.

16. The positioning system of claim 9, wherein the surface plates are configured to provide a watertight seal between the surface plates and the mounting surface.

\* \* \* \* \*